US 8,158,265 B2

(12) United States Patent
Kimura

(10) Patent No.: US 8,158,265 B2
(45) Date of Patent: Apr. 17, 2012

(54) ADDITION-CURABLE SILICONE COMPOSITION THAT PRODUCES CURED PRODUCT HAVING HIGH REFRACTIVE INDEX, AND OPTICAL ELEMENT ENCAPSULATING MATERIAL FORMED FROM THE COMPOSITION

(75) Inventor: Shinji Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 96 days.

(21) Appl. No.: 12/627,827

(22) Filed: Nov. 30, 2009

(65) Prior Publication Data

US 2010/0145000 A1 Jun. 10, 2010

(30) Foreign Application Priority Data

Dec. 5, 2008 (JP) ................. 2008-310777

(51) Int. Cl.
*C08L 83/04* (2006.01)
(52) U.S. Cl. .......... 428/447; 525/477; 525/478; 528/15; 528/31; 528/32; 528/43
(58) Field of Classification Search .......... None
See application file for complete search history.

(56) References Cited

U.S. PATENT DOCUMENTS

| 6,432,137 B1 | 8/2002 | Nanushyan et al. |
| 2004/0116640 A1 | 6/2004 | Miyoshi |
| 2004/0178509 A1 | 9/2004 | Yoshino et al. |
| 2006/0073347 A1 | 4/2006 | Morita et al. |
| 2006/0081864 A1 | 4/2006 | Nakazawa |
| 2007/0112147 A1 | 5/2007 | Morita et al. |
| 2008/0160323 A1* | 7/2008 | Mosley et al. ............ 428/447 |
| 2010/0276721 A1* | 11/2010 | Yoshitake et al. ............ 257/99 |

FOREIGN PATENT DOCUMENTS

| EP | 2058377 A1 | 5/2009 |
| JP | 8-127657 A | 5/1996 |
| JP | 2003-128922 A | 5/2003 |
| JP | 2004-292807 A | 10/2004 |
| JP | 2005-76003 A | 3/2005 |
| JP | 2005-307015 A | 11/2005 |
| WO | WO 01/17570 A1 | 3/2001 |
| WO | WO 03/035763 A1 | 5/2003 |
| WO | WO 2007/100445 * | 9/2007 |

OTHER PUBLICATIONS

"Synthesis and Characterization of alt-Copoly(carbosiloxane)s Containing Oligodiphenylsiloxane Segments" authored by Gädda et al., and published in Journal of Polymer Science, Part A: Polymer Chemistry (2005) 43, 2155-2163.*
European Search Report dated Feb. 19, 2010 for European application No. 09015105.1.
English-language translation of Office Action dated May 17, 2011 in Japanese Patent Application No. 2008-310777.
Office Action issued Jun. 1, 2011, in European Patent Application No. 09 015 105.1.

* cited by examiner

*Primary Examiner* — Marc Zimmer
(74) *Attorney, Agent, or Firm* — Birch, Stewart, Kolasch & Birch, LLP

(57) ABSTRACT

Provided is an addition-curable silicone composition including A: a diorganopolysiloxane having a structure represented by a formula (1): $(R^1)(R^2)_2SiO((Ar)_2SiO)_nSi(R^2)_2(R^1)$ (where $R^1$ represents an aliphatic unsaturated group, $R^2$ represents identical or different, unsubstituted or substituted monovalent hydrocarbon groups, Ar represents identical or different, unsubstituted or substituted aryl groups that may or may not contain a hetero atom, and n represents an integer of 1 or greater), B: an organosilicon compound containing at least two hydrogen atoms bonded to silicon atoms per molecule, and containing no aliphatic unsaturated groups, in an amount that is sufficient to cure the composition in the presence of the hydrosilylation catalyst described below, and C: a platinum group metal-based hydrosilylation catalyst. A cured product of this addition-curable silicone composition has superior transparency, a high refractive index, and favorable strength properties, and the composition can therefore be used as an optical element encapsulating material.

13 Claims, No Drawings

ADDITION-CURABLE SILICONE COMPOSITION THAT PRODUCES CURED PRODUCT HAVING HIGH REFRACTIVE INDEX, AND OPTICAL ELEMENT ENCAPSULATING MATERIAL FORMED FROM THE COMPOSITION

BACKGROUND OF THE INVENTION

1. Field of the Invention

The present invention relates to a curable silicone composition that cures by an addition curing reaction, and relates particularly to an addition-curable silicone composition that produces a cured product which has favorable rubber-like properties and strength properties, a high degree of transparency and a high refractive index, as well as an optical element encapsulating material formed from such a composition.

2. Description of the Prior Art

An addition-curable silicone composition comprises an organopolysiloxane containing aliphatic unsaturated groups such as alkenyl groups, and cures via a hydrosilylation reaction to generate a cured product. Cured products obtained in this manner exhibit excellent heat resistance, cold resistance and electrical insulation properties, and are also transparent, and are consequently used in a wide variety of optical applications.

Silicone rubbers used in optical applications require a high degree of transparency and a high refractive index. In order to satisfy these requirements, a dimethylsiloxane-diphenylsiloxane copolymer or a methylphenylpolysiloxane is typically used as the raw material for the main backbone within the cured product.

However, synthesis of a polysiloxane of this type that is capable of producing a cured product with a refractive index of 1.54 or greater has proven difficult. Further, branched polysiloxanes containing introduced phenyl groups are capable of producing cured products with a refractive index of approximately 1.53 to 1.54, but these cured products tend to exist in a hard resin-like state that lacks elasticity. Accordingly, compositions comprising a combination of a branched organopolysiloxane and a linear organopolysiloxane have been proposed, but these are not entirely satisfactory in terms of their transparency, refractive index and elasticity and the like (see Patent Documents 1 to 7).

[Patent Document 1] JP 2005-307015 A
[Patent Document 2] US 2006/0073347 A1
[Patent Document 3] US 2004/0116640 A1
[Patent Document 4] US 2004/0178509 A1
[Patent Document 5] US 2006/0081864 A1
[Patent Document 6] JP 2005-076003 A
[Patent Document 7] US 2007/0112147 A1

SUMMARY OF THE INVENTION

An object of the present invention is to provide an addition-curable silicone composition that produces a cured product which exhibits a high degree of transparency, a high refractive index and favorable strength properties, and also to provide an optical element encapsulating material formed from this composition.

As a result of intensive investigation, the inventor of the present invention discovered that by using a diarylpolysiloxane as the raw material for the main backbone within the cured product, a silicone cured product, and in particular a silicone rubber, could be obtained which exhibited a high degree of transparency, a high refractive index and favorable strength properties, and the inventor were therefore able to complete the present invention.

Accordingly, a first aspect of the present invention provides an addition-curable silicone composition comprising:

A: a diorganopolysiloxane having a structure represented by a formula (1) shown below:

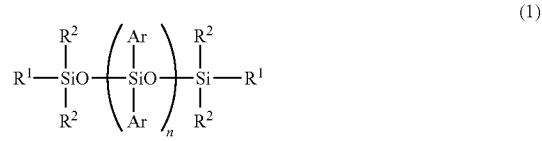

(1)

(wherein $R^1$ represents an aliphatic unsaturated group, $R^2$ represents identical or different, unsubstituted or substituted monovalent hydrocarbon groups, Ar represents identical or different, unsubstituted or substituted aryl groups that may or may not contain a hetero atom, and n represents an integer of 1 or greater), B: an organosilicon compound containing at least two hydrogen atoms bonded to silicon atoms per molecule, and containing no aliphatic unsaturated groups, in an amount that is sufficient to cure the composition in the presence of the hydrosilylation catalyst described below, and C: a platinum group metal-based hydrosilylation catalyst.

A second aspect of the present invention provides a cured product obtained by curing the above composition.

A third aspect of the present invention provides an optical element encapsulating material formed from the above composition.

A fourth aspect of the present invention provides an optical element that has been encapsulated with a cured product of the above composition.

A fifth aspect of the present invention provides a method of encapsulating an optical element, the method comprising:
applying the above composition to the optical element, and
curing the applied composition.

A sixth aspect of the present invention provides use of the above composition as an optical element encapsulating material.

A cured product such as a gel or an elastomer obtained by curing the addition-curable silicone composition of the present invention exhibits a high degree of transparency, a high refractive index and favorable strength properties, and therefore the composition of the present invention can be used as an optical element encapsulating material.

DETAILED DESCRIPTION OF THE PREFERRED EMBODIMENTS

A more detailed description of the present invention is presented below.

[Component A]

The component A is a straight-chain diorganopolysiloxane in which the main chain consists of repeating diarylsiloxane units and the molecular chain terminals are both blocked with a triorganosiloxy group that contains an aliphatic unsaturated group. The organopolysiloxane of the component A may be either a single compound, or a combination of two or more compounds having different molecular weights or different varieties of organic groups bonded to the silicon atoms.

Examples of the aryl groups represented by Ar in the formula (1) include aromatic hydrocarbon groups such as a phenyl group or naphthyl group; aromatic groups that contain a hetero atom (such as O, S or N), such as a furanyl group; and aromatic groups in which some or all of the hydrogen atoms within any of the above aromatic groups have been substituted with substituents such as halogen atoms (such as a chlorine atom, bromine atom or fluorine atom). Ar is preferably an unsubstituted aromatic hydrocarbon group, and is particularly preferably a phenyl group.

There are no particular restrictions on the aliphatic unsaturated group represented by $R^1$ in the formula (1), provided it is capable of stably maintaining the composition of the present invention in an uncured state prior to commencement of the addition reaction, and is then capable of readily curing the composition following commencement of the addition reaction. Examples of $R^1$ include ethylenic unsaturated groups and acetylenic unsaturated groups. The aliphatic unsaturated groups of $R^1$ may be a single type of group or a combination of two or more different types.

Herein, an "ethylenic unsaturated group" refers to an organic group that contains a carbon-carbon double bond, and may or may not contain a hetero atom such as an oxygen atom, nitrogen atom or sulfur atom. Specific examples include alkenyl groups of 2 to 20 carbon atoms, and preferably 2 to 10 carbon atoms, such as a vinyl group, allyl group, 5-hexenyl group, propenyl group or butenyl group; alkadienyl groups of 4 to 10 carbon atoms such as a 1,3-butadienyl group; combinations of an above-mentioned alkenyl group and a carbonyloxy group such as an acryloyloxy group ($-OC(O)CH=CH_2$) or methacryloyloxy group ($-OC(O)C(CH_3)=CH_2$); and combinations of an above-mentioned alkenyl group and a carbonylamino group such as an acrylamido group ($-NHC(O)CH=CH_2$).

Further, an "acetylenic unsaturated group" refers to an organic group that contains a carbon-carbon triple bond, and may or may not contain a hetero atom such as an oxygen atom, nitrogen atom or sulfur atom. Specific examples include alkynyl groups of 2 to 20 carbon atoms, and preferably 2 to 10 carbon atoms, such as an ethynyl group or propargyl group; and combinations of an above-mentioned alkynyl group and a carbonyloxy group such as an ethynylcarbonyloxy group ($-OC(O)C\equiv CH$).

Of these, from the viewpoint of factors such as the productivity and the cost when obtaining the raw material for the component A, and the reactivity of the resulting component A, the above aliphatic unsaturated groups is preferably an alkenyl group, is more preferably a vinyl group, an allyl group or a 5-hexenyl group, and is particularly preferably a vinyl group. As described below, an aliphatic unsaturated group-containing compound other than the component A may, in some cases, be included in the composition of the present invention, but the proportion of the aliphatic unsaturated groups within the component A to all the aliphatic unsaturated groups within the composition of the present invention is preferably within a range from 50 to 100% by mass, and is more preferably from 80 to 100% by mass.

Examples of the unsubstituted or substituted monovalent hydrocarbon groups represented by $R^2$ in the formula (1) include the aliphatic unsaturated groups described above, and unsubstituted or substituted monovalent hydrocarbon groups other than aliphatic unsaturated groups. Examples of the substituent within the substituted monovalent hydrocarbon groups include halogen atoms such as a chlorine atom, bromine atom or fluorine atom. Specific examples of the unsubstituted or substituted monovalent hydrocarbon groups other than aliphatic unsaturated groups include alkyl groups of 1 to 6 carbon atoms such as a methyl group, ethyl group, propyl group, isopropyl group, butyl group, isobutyl group, sec-butyl group or tert-butyl group; haloalkyl groups of 1 to 4 carbon atoms such as a chloromethyl group or 3,3,3-trifluoropropyl group; and aryl groups of 6 to 10 carbon atoms such as a phenyl group or tolyl group. Of these, an alkyl group of 1 to 6 carbon atoms, a phenyl group, or a vinyl group is preferred, and a methyl group is particularly desirable.

In the component A, the value of n, which represents the polymerization degree of the diarylsiloxane units, is preferably an integer within a range from 1 to 100, is more preferably an integer from 1 to 20, and is even more preferably an integer from 2 to 10. In those cases where the component A is a combination of two or more diorganopolysiloxanes, the value of n in each of the diorganopolysiloxanes is an integer of 1 or greater and is preferably as described above, and the average value of n in the whole of the component A is typically a positive number of 1 or greater, is preferably a positive number within a range from 1 to 100, is more preferably a positive number from 1 to 20, and is even more preferably a positive number from 2 to 10.

The component A can be obtained, for example, by subjecting a difunctional silane having two Ar groups, such as a dichlorodiarylsilane such as dichlorodiphenylsilane or a dialkoxydiarylsilane such as a dialkoxydiphenylsilane to hydrolysis and condensation, and blocking the terminals of the produced diorganopolysiloxane using a terminal blocking agent containing an aliphatic unsaturated group, such as chlorodimethylvinylsilane or dimethyldiphenyldivinyldisiloxane, either following the hydrolysis-condensation or at the same time as performing the hydrolysis-condensation.

[Component B]

The component B is an organosilicon compound containing at least two hydrogen atoms bonded to silicon atoms (namely, SiH groups) per molecule, and containing no aliphatic unsaturated groups (namely, an SiH group-containing organic compound). The component B functions as a cross-linking agent by undergoing a hydrosilylation addition reaction with the component A. The component B may be either a single compound, or a combination of two or more different compounds. Any known compound may be used as the component B, provided the compound is an organosilicon compound containing at least two SiH groups per molecule and containing no aliphatic unsaturated groups. Examples include organohydrogenpolysiloxanes, organohydrogensilanes, organic oligomers and organic polymers any of which contain at least two SiH groups per molecule and contain no aliphatic unsaturated groups. Of these compounds, organohydrogenpolysiloxanes containing at least two SiH groups per molecule and containing no aliphatic unsaturated groups are preferred.

The organic groups bonded to silicon atoms within the component B are unsubstituted monovalent hydrocarbon groups other than aliphatic unsaturated groups, or monovalent hydrocarbon groups that are other than aliphatic unsaturated groups and that have been substituted with a substituent having no adverse effects on the storage stability or curability of the composition of the present invention, such as at least one of a halogen atom (such as a chlorine atom, bromine atom or fluorine atom), an epoxy group-containing group (such as an epoxy group, glycidyl group or glycidoxy group) or an alkoxy group (such as a methoxy group, ethoxy group, propoxy group or butoxy group). Examples of these monovalent hydrocarbon groups include the alkyl groups of 1 to 6 carbon atoms, the haloalkyl groups of 1 to 4 carbon atoms, and the aryl groups of 6 to 10 carbon atoms any of which are listed above as specific examples of the unsubstituted or substituted monovalent hydrocarbon groups represented by $R^2$ in the formula (1). These organic groups are preferably the alkyl groups of 1 to 6 carbon atoms or the aryl groups of 6 to 10 carbon atoms, and are more preferably either a methyl group or a phenyl group. Further, in those cases where the component B contains a monovalent hydrocarbon group that has been substituted with at least one of an epoxy group-containing group and an alkoxy group, the cured product of the composition of the present invention can be imparted with favorable adhesiveness.

In those cases where the component B is an organohydrogenpolysiloxane containing at least two SiH groups per molecule and containing no aliphatic unsaturated groups, there are no particular restrictions on the molecular structure of the organohydrogenpolysiloxane, and any of the conventionally produced organohydrogenpolysiloxanes including a straight-chain, cyclic, branched-chain or three dimensional network (resin-like) structure may be used.

The organohydrogenpolysiloxane contains at least two (typically from 2 to 300), and preferably three or more (typically from 3 to 200, and preferably from 4 to 100) SiH groups within each molecule. In those cases where the organohydrogenpolysiloxane has a straight-chain or branched-chain structure, these SiH groups may exist solely at the molecular chain terminals, solely at non-terminal positions within the molecular chain, or at both of these positions.

The number of silicon atoms within each molecule of the organohydrogenpolysiloxane (the polymerization degree) is preferably within a range from 2 to 1,000, more preferably from 3 to 200, and still more preferably from 4 to 100. Furthermore, the organohydrogenpolysiloxane is preferably a liquid at 25° C., and the viscosity at 25° C., measured using a rotational viscometer, is preferably within a range from 1 to 1,000 mPa·s, and is more preferably from 10 to 100 mPa·s.

Examples of compounds that may be used as the above organohydrogenpolysiloxane include compounds represented by an average composition formula (2) shown below.

$$R^3_a H_b SiO_{(4-a-b)/2} \quad (2)$$

(wherein $R^3$ represents identical or different, unsubstituted or substituted silicon atom-bonded monovalent hydrocarbon groups other than aliphatic unsaturated groups, and a and b represent positive numbers that satisfy $0.7 \leq a \leq 2.1$, $0.001 \leq b \leq 1.0$ and $0.8 \leq a+b \leq 3.0$, and preferably satisfy $1.0 \leq a \leq 2.0$, $0.01 \leq b \leq 1.0$ and $1.5 \leq a+b \leq 2.5$)

Examples of $R^3$ include the alkyl groups of 1 to 6 carbon atoms, the haloalkyl groups of 1 to 4 carbon atoms, and the aryl groups of 6 to 10 carbon atoms any of which are listed above as specific examples of the unsubstituted or substituted monovalent hydrocarbon groups represented by $R^2$ in the formula (1). $R^3$ is preferably an alkyl group of 1 to 6 carbon atoms or an aryl group of 6 to 10 carbon atoms, and is more preferably a methyl group or a phenyl group.

Examples of organohydrogenpolysiloxanes represented by the average composition formula (2) include cyclic compounds comprising at least four organohydrogensiloxane units represented by a formula: $R^3HSiO$, compounds represented by a formula: $R^3_3SiO(HR^3SiO)_c SiR^3_3$, compounds represented by a formula: $HR^3_2SiO(HR^3SiO)_c SiR^3_2H$, and compounds represented by a formula: $HR^3_2SiO(HR^3SiO)_c (R^3_2SiO)_d SiR^3_2H$. In the above formulas, $R^3$ is as defined above, and c and d represent positive numbers of at least 1.

Alternatively, the organohydrogenpolysiloxane represented by the above average composition formula (2) may be an organohydrogenpolysiloxane comprising at least one type of unit selected from among siloxane units represented by a formula: $HSiO_{1.5}$, siloxane units represented by a formula: $R^3HSiO$, and siloxane units represented by a formula: $R^3_2HSiO_{0.5}$. These organohydrogenpolysiloxanes may also include at least one type of unit selected from among monoorganosiloxane units containing no SiH group, diorganosiloxane units containing no SiH group, triorganosiloxane units containing no SiH group, and an $SiO_{4/2}$ unit. $R^3$ in these formulas is as defined above.

Of all the organosiloxane units contained within the organohydrogenpolysiloxane represented by the average composition formula (2), 30 to 100 mol % of the units are preferably methylhydrogensiloxane units.

In those cases where the component B is an organohydrogenpolysiloxane containing at least two SiH groups per molecule, and containing no aliphatic unsaturated groups, specific examples include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of diphenylsiloxane and methylhydrogensiloxane with both molecular chain terminals blocked with trimethylsiloxy groups, copolymers of methylphenylsiloxane and methylhydrogensiloxane with both molecular chain terminals blocked with trimethylsiloxy groups, copolymers of dimethylsiloxane, methylhydrogensiloxane and methylphenylsiloxane with both molecular chain terminals blocked with trimethylsiloxy groups, copolymers of dimethylsiloxane, methylhydrogensiloxane and diphenylsiloxane with both molecular chain terminals blocked with trimethylsiloxy groups, methylhydrogenpolysiloxane with both molecular chain terminals blocked with dimethylhydrogensiloxy groups, dimethylpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups, copolymers of dimethylsiloxane and methylphenylsiloxane with both molecular chain terminals blocked with dimethylhydrogensiloxy groups, copolymers of dimethylsiloxane and diphenylsiloxane with both molecular chain terminals blocked with dimethylhydrogensiloxy groups, methylphenylpolysiloxane with both molecular chain terminals blocked with dimethylhydrogensiloxy groups, diphenylpolysiloxane with both molecular chain terminals blocked with dimethylhydrogensiloxy groups, copolymers of diphenylsiloxane and methylhydrogensiloxane with both molecular chain terminals blocked with dimethylhydrogensiloxy groups, organohydrogenpolysiloxanes in which some or all of the methyl groups in each of the above compounds have been substituted with other alkyl groups such as ethyl groups or propyl groups, organosiloxane copolymers consisting of siloxane units represented by the formula: $R^3_3SiO_{0.5}$, siloxane units represented by the formula: $R^3_2HSiO_{0.5}$, and siloxane units represented by the formula: $SiO_2$, organosiloxane copolymers consisting of siloxane units represented by the formula: $R^3_2HSiO_{0.5}$ and siloxane units represented by the formula: $SiO_2$, organosiloxane copolymers consisting of siloxane units represented by the formula: $R^3HSiO$ and either one of, or both, siloxane units represented by the formula: $R^3SiO_{1.5}$ and siloxane units represented by the formula: $HSiO_{1.5}$, and mixtures of two or more of the above organopolysiloxanes. In the above formulas, $R^3$ is as defined above.

The blend amount of the component B is an amount sufficient to cure the composition of the present invention in the presence of the hydrosilylation catalyst of component C, and is typically an amount that yields a molar ratio of the SiH groups within the component B relative to all the aliphatic unsaturated groups within the composition of the present invention that is within a range from 0.2 to 5, and preferably from 0.5 to 2. In those cases where the component A is the only aliphatic unsaturated group-containing compound within the composition, the blend amount of the component B is an amount sufficient to yield a molar ratio of the SiH groups within the component B relative to the aliphatic unsaturated groups within the component A that is typically within a range from 0.2 to 5, and preferably from 0.5 to 2.

[Component C]

The platinum group metal-based hydrosilylation catalyst of the component C may use any catalyst that is capable of accelerating the hydrosilylation addition reaction between the silicon atom-bonded aliphatic unsaturated groups within the component A and the SiH groups within the component B. The component C may use either a single catalyst or a combination of two or more different catalysts. Examples of the component C include platinum-group metals such as platinum, palladium and rhodium, and platinum-group metal compounds such as chloroplatinic acid, alcohol-modified chloroplatinic acid, coordination compounds of chloroplatinic acid with olefins, vinylsiloxane or acetylene compounds, tetrakis(triphenylphosphine)palladium and chlorotris(triphenylphosphine)rhodium, and of these, platinum compounds are particularly preferred.

The blend amount of the component C need only be sufficient to be effective as a hydrosilylation catalyst. A preferred amount, calculated as the mass of the platinum group metal element relative to the combined mass of the components A and B, is within a range from 0.1 to 1,000 ppm, and amounts within a range from 1 to 500 ppm are more preferable.

[Other Components]

In addition to the components A to C described above, other components may also optionally be added to the composition of the present invention, provided these optional components do not impair the objects of the present invention. Specific examples of these other components include those described below. These other components can be used either alone, or in combinations of two or more different materials.

Aliphatic Unsaturated Group-Containing Compounds Other than Component A

The composition of the present invention may include, in addition to the component A, one or more other aliphatic unsaturated group-containing compounds capable of undergoing an addition reaction with the component B. These aliphatic unsaturated group-containing compounds other than the component A preferably contribute to the formation of the cured product, and examples include organopolysiloxanes other than the component A that contain at least two aliphatic unsaturated groups per molecule. The molecular structure of these compounds may be any structure such as a straight-chain, cyclic, branched-chain or three dimensional network structure.

In addition, specific examples of aliphatic unsaturated group-containing compounds other than the component A include monomers such as butadiene and diacrylates derived from polyfunctional alcohols; polyolefins such as polyethylene, polypropylene and copolymers of styrene and another ethylenic unsaturated compound (such as acrylonitrile or butadiene); and oligomers or polymers derived from functional substituted organic compounds such as the esters of acrylic acid, methacrylic acid or maleic acid. These aliphatic unsaturated group-containing compounds other than the component A may be either liquid or solid at room temperature.

Addition Reaction Retarders

In order to ensure satisfactory pot life, an addition reaction retarder may be added to the composition of the present invention. Any compound that exhibits an inhibiting effect on the curing reaction promoted by the hydrosilylation catalyst of the aforementioned component C may be used as the addition reaction retarder, and conventional reaction retarders can be used. Specific examples of the addition reaction retarder include phosphorus-containing compounds such as triphenylphosphine, nitrogen-containing compounds such as tributylamine, tetramethylethylenediamine and benzotriazole, sulfur-containing compounds, acetylene-based compounds including acetylene alcohols (such as 1-ethynylcyclohexanol and 3,5-dimethyl-1-hexyn-3-ol), compounds containing two or more alkenyl groups, hydroperoxy compounds, and maleic acid derivatives.

The size of the curing inhibiting effect provided by the addition reaction retarder varies depending on the chemical structure of the addition reaction retarder, and consequently the amount added of the addition reaction retarder is preferably adjusted to the most appropriate amount for the particular addition reaction retarder being used. By using the most appropriate amount of the addition reaction retarder, a composition with superior long term storage stability at room temperature and superior heat-curability can be obtained.

Other Optional Components

Conventional antioxidants such as 2,6-di-t-butyl-4-methylphenol may be added to the composition of the present invention in order to suppress coloration, turbidity and oxidative degradation of the cured product. Further, light stabilizers such as hindered amine-based light stabilizers may also be added to the composition of the present invention to impart resistance to light degradation. Moreover, inorganic fillers such as fumed silica may be added to the composition of the present invention to improve the strength of the cured product obtained from the composition, provided they have no adverse effect on the transparency of the cured product. Other additives such as dyes, pigments and flame retardants and the like may also be added to the composition of the present invention if required.

[Cured Product]

The silicone composition of the present invention can be prepared by using normal methods to mix the components A to C and optionally any of the above other components. The composition can then be cured using a conventional curing method under conventional curing conditions. Specifically, the composition is typically cured by heating at 80 to 200° C., and preferably at 100 to 160° C. The heating time may be within a range from approximately 0.5 minutes to 5 hours, and is particularly within a range from 1 minute to 3 hours. In those cases where a high degree of precision is required, such as when the composition is used for encapsulating an LED, the curing time is preferably comparatively long. There are no particular restrictions on the physical state of the resulting cured product, which may be, for example, any of a gel-like cured product, an elastomer cured product, and a resin cured product. The cured product is typically colorless and transparent with a high refractive index (namely, a refractive index of not less than 1.54, and preferably within a range from 1.54 to 1.65).

[Optical Element Encapsulating Material]

A cured product of the composition of the present invention not only exhibits the same excellent heat resistance, cold resistance and insulation properties as the cured products of conventional addition-curable silicone compositions, but as described above, also has superior transparency and a high refractive index. Accordingly, the composition of the present invention can be used favorably as an optical element encapsulating material, which is required to exhibit superior transparency and a high refractive index following curing. Examples of optical elements that may be encapsulated with a cured product of the composition of the present invention include LEDs, semiconductor lasers, photodiodes, phototransistors, solar cells, and CCDs. These types of optical elements can be encapsulated by applying the composition of the present invention to the optical element, and then curing the applied composition under conventional curing conditions using a conventional curing method, or more specifically, in the manner described above.

EXAMPLES

A more detailed description of the present invention is presented below based on a series of preparation examples, examples and comparative examples, although the present invention is in no way limited by the examples described below. In the examples, viscosity values describe values measured at 25° C. using a rotational viscometer. The external appearance was evaluated by visual inspection. Refractive index values refer to values measured at 589 nm and 25° C. using a digital refractometer RX-5000, manufactured by ATAGO Co., Ltd. The hardness, breaking elongation and tensile strength were measured in accordance with JIS K 6249. Further, in the following examples, the symbols used in the average composition formulas for silicone oils represent the units listed below. Furthermore, the number of mols described together with each silicone oil refers to the number of mols of vinyl groups or SiH groups within that silicone oil.

$M^H$: $(CH_3)_2HSiO_{1/2}$
$M$: $(CH_3)_3SiO_{1/2}$
$M^{Vi}$: $(CH_2=CH)(CH_3)_2SiO_{1/2}$
$M^{\Phi Vi}$: $(CH_2=CH)(C_6H_5)(CH_3)SiO_{1/2}$
$D^H$: $(CH_3)HSiO_{2/2}$
$D$: $(CH_3)_2SiO_{2/2}$
$D^{Vi}$: $(CH_2=CH)(CH_3)SiO_{2/2}$
$D^{\Phi}$: $(C_6H_5)_2SiO_{2/2}$

Preparation Example 1

Preparation of Platinum Catalyst

A reaction product of hexachloroplatinic acid and sym-tetramethyldivinyldisiloxane was diluted with a silicone oil with an average composition formula of $M^{Vi}_2D_{19}D^{\Phi}_9$ and a viscosity of 0.7 Pa·s to achieve a platinum concentration of 1.0% by mass, thus completing preparation of the platinum catalyst (catalyst A) used in the following examples and comparative examples.

Preparation Example 2

Synthesis of Silicone Oil with Average Composition Formula: $M^{Vi}_2D^{\Phi}_{2.8}$ A 2 L flask was charged with 1,000 g of water and 585 g of toluene, the mixture was heated to 75° C., 500 g of dichlorodiphenylsilane was added dropwise to the flask, and the resulting mixture was stirred at 80° C. for 5 hours. The reaction liquid was then cooled to room temperature, and the water phase was separated and discarded. The organic phase was dried over 50 g of anhydrous sodium sulfate, and the anhydrous sodium sulfate was subsequently removed by filtration, yielding a toluene solution of a dichlorodiphenylsilane hydrolyzed oligomer. A 5 L flask was charged with 357 g of chlorodimethylvinylsilane, 300 g of triethylamine and 650 g of toluene, the mixture was cooled to 10° C., and the previously obtained toluene solution of a dichlorodiphenylsilane hydrolyzed oligomer was added dropwise to the flask. Following completion of the addition, stirring was continued at 80° C. for 5 hours. The reaction liquid was then cooled to room temperature, 2,250 g of dilute hydrochloric acid was added and mixed, and the water phase was separated and discarded. The organic phase was washed with sodium bicarbonate water and then with water, and was then concentrated under reduced pressure to remove the toluene. The resulting liquid was treated with activated carbon, yielding a colorless and transparent silicone oil with the average composition formula: $M^{Vi}_2D^{\Phi}_{2.8}$.

Preparation Example 3

Synthesis of Silicone Oil with Average Composition Formula: $M^{\Phi Vi}_2D^{\Phi}_{3.6}$ A 500 mL flask was charged with 200 g of water and 117 g of toluene, the mixture was heated to 75° C., 100 g of dichlorodiphenylsilane was added dropwise to the flask, and the resulting mixture was stirred at 80° C. for 3 hours. The reaction liquid was then cooled to room temperature, and the water phase was separated and discarded. The organic phase was dried over 10 g of anhydrous sodium sulfate, and the anhydrous sodium sulfate was subsequently removed by filtration, yielding a toluene solution of a dichlorodiphenylsilane hydrolyzed oligomer. The solution was then concentrated under reduced pressure to remove the toluene, and 30.6 g of dimethyldiphenyldivinyldisiloxane was added and mixed. 5.0 g of concentrated sulfuric acid was then added, and a condensation reaction was conducted for 5 hours under conditions of 50° C. and 15 mmHg. Subsequently, 100 g of toluene and 100 g of a 10% by mass aqueous solution of Glauber's salt were added and mixed, and the water phase was then separated and discarded. The organic phase was washed with sodium bicarbonate water and then with water, and was then concentrated under reduced pressure to remove the toluene. The resulting white cloudy liquid was filtered, yielding a colorless and transparent silicone oil with the average composition formula: $M^{\Phi Vi}_2D^{\Phi}_{3.6}$.

Example 1

A mixture containing 100 g (272 mmol) of the silicone oil with an average composition formula of $M^{Vi}_2D^{\Phi}_{2.8}$ and a viscosity of 0.4 Pa·s, and 51.3 g (305 mmol) of a silicone oil with an average composition formula of $M^H_2D^H_2D^{\Phi}_2$ and a viscosity of 0.02 Pa·s was mixed with 0.075 g of ethynylcyclohexanol as a retarder and 0.15 g of the catalyst A, thus yielding a silicone composition. This composition was cured by heating at 150° C. for 2 hours. Regarding the resulting elastomer, evaluation of the external appearance and measurement of the physical properties were conducted. The results are shown in Table 1.

Example 2

A mixture containing 100 g (197 mmol) of the silicone oil with an average composition formula of $M^{\Phi Vi}_2D^{\Phi}_{3.6}$ and a viscosity of 3.1 Pa·s, and 37.5 g (223 mmol) of a silicone oil with an average composition formula of $M^H_2D^H_2D^{\Phi}_2$ and a viscosity of 0.02 Pa·s was mixed with 0.075 g of ethynylcyclohexanol as a retarder and 0.15 g of the catalyst A, thus yielding a silicone composition. This composition was cured by heating at 150° C. for 2 hours. Regarding the resulting elastomer, evaluation of the external appearance and measurement of the physical properties were conducted. The results are shown in Table 1.

Comparative Example 1

A mixture containing 100 g (20.0 mmol) of a silicone oil with an average composition formula of $M^{Vi}_2D_{68}D^\Phi_{30}$ and a viscosity of 4.0 Pa·s, and 3.8 g (22.6 mmol) of a silicone oil with an average composition formula of $M^H_2D^H_2D^\Phi_2$ and a viscosity of 0.02 Pa·s was mixed with 0.05 g of ethynylcyclohexanol as a retarder and 0.10 g of the catalyst A, thus yielding a silicone composition. This composition was cured by heating at 150° C. for 2 hours. Regarding the resulting elastomer, evaluation of the external appearance and measurement of the physical properties were conducted. The results are shown in Table 1.

Example 3

A mixture containing 50 g (136 mmol) of the silicone oil with an average composition formula of $M^{Vi}_2D^\Phi_{2.8}$ and a viscosity of 0.4 Pa·s, 50 g (115 mmol) of a silicone oil with an average composition formula of $M_2D_{3.4}D^{Vi}_{6.5}D^\Phi_{8.6}$ and a viscosity of 2.0 Pa·s, and 38 g (226 mmol) of a silicone oil with an average composition formula of $M^H_2D^H_2D^\Phi_2$ and a viscosity of 0.02 Pa·s was mixed with 0.05 g of ethynylcyclohexanol as a retarder and 0.10 g of the catalyst A, thus yielding a silicone composition. This composition was cured by heating at 150° C. for 2 hours. Regarding the resulting elastomer, evaluation of the external appearance and measurement of the physical properties were conducted. The results are shown in Table 1.

Comparative Example 2

A mixture containing 50 g (10 mmol) of a silicone oil with an average composition formula of $M^{Vi}_2D_{68}D^\Phi_{30}$ and a viscosity of 4.0 Pa·s, 50 g (115 mmol) of a silicone oil with an average composition formula of $M_2D_{3.4}D^{Vi}_{6.5}D^\Phi_{8.6}$ and a viscosity of 2.0 Pa·s, and 19 g (113 mmol) of a silicone oil with an average composition formula of $M^H_2D^H_2D^\Phi_2$ and a viscosity of 0.02 Pa·s was mixed with 0.05 g of ethynylcyclohexanol as a retarder and 0.10 g of the catalyst A, thus yielding a silicone composition. This composition was cured by heating at 150° C. for 2 hours. Regarding the resulting elastomer, evaluation of the external appearance and measurement of the physical properties were conducted. The results are shown in Table 1.

What is claimed is:

1. An addition-curable silicone composition, comprising:
    A: a diorganopolysiloxane having a structure represented by a formula (1) shown below:

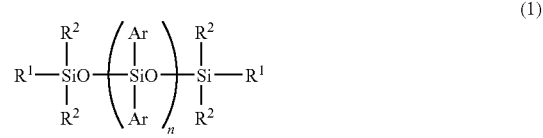

(1)

wherein $R^1$ represents an aliphatic unsaturated group, $R^2$ represents identical or different, unsubstituted or substituted monovalent hydrocarbon groups, Ar represents a phenyl group, and n represents an integer of 1 or greater,
    B: an organosilicon compound containing at least two hydrogen atoms bonded to silicon atoms per molecule, and containing no aliphatic unsaturated groups, wherein 30 to 100 mol % of the units of said organohydrogenpolysiloxane are methylhydrogen siloxane units, said organosilicon compound component B being an organohydrogenpolysiloxane represented by an average composition formula (2) shown below:

$$R^3_a H_b SiO_{(4-a-b)/2} \qquad (2)$$

wherein $R^3$ represents identical or different, unsubstituted or substituted silicon atom-bonded monovalent hydrocarbon groups other than aliphatic unsaturated groups, and a and b represent positive numbers that satisfy $0.7 \leq a \leq 2.1$, $0.001 \leq b \leq 1.0$ and $0.8 \leq a+b \leq 3.0$, in an amount that is sufficient to cure the composition in presence of a hydrosilylation catalyst described below, and
    C: a platinum group metal-based hydrosilylation catalyst.
2. The composition according to claim 1, wherein in the formula (1), $1 \leq n \leq 100$.
3. The composition according to claim 1, which produces a cured product with a refractive index of not less than 1.54.
4. A cured product obtained by curing the composition defined in claim 1.
5. The cured product according to claim 4, having a refractive index of not less than 1.54.
6. An optical element encapsulating material formed from the composition defined in claim 1.
7. An optical element that has been encapsulated with a cured product of the composition defined in claim 1.
8. A method of encapsulating an optical element, the method comprising:

TABLE 1

|  | Example 1 | Example 2 | Comparative example 1 | Example 3 | Comparative example 2 |
| --- | --- | --- | --- | --- | --- |
| External appearance | Colorless, transparent | Colorless, transparent | Faint yellow, transparent | Colorless, transparent | Colorless, transparent |
| Refractive index ($n_D^{25}$) | 1.54 | 1.57 | 1.51 | 1.54 | 1.53 |
| Hardness (type A) | 65 | 68 | 12 | 54 | 38 |
| Breaking elongation (%) | 40 | 100 | 60 | 30 | 30 |
| Tensile strength (MPa) | 1.6 | 2.5 | 0.2 | 0.7 | 0.4 | applying the composition defined in claim 1 to the optical element, and curing the applied composition.

9. The composition according to claim 1, wherein the organosilicon compound of component B contains at least three hydrogen atoms bonded to silicon atoms per molecule.

10. The composition according to claim 1, wherein $R^3$ in the average composition formula (2) is an alkyl group of 1 to 6 carbon atoms or an aryl group of 6 to 10 carbon atoms.

11. The composition according to claim 1, wherein $R^3$ in the average composition formula (2) is a methyl group or a phenyl group.

12. The composition according to claim 11, wherein the organohydrogenpolysiloxane (B) represented by the average composition formula (2) is a compound represented by the formula:

$$HR^3{}_2SiO(HR^3SiO)_c(R^3{}_2SiO)_dSiR^3{}_2H$$

wherein $R^3$ is a methyl group or a phenyl group and c and d represent positive numbers of at least 1.

13. The composition according to claim 1, wherein $R^2$ in the formula (1) is an alkyl group of 1 to 6 carbons atoms, a phenyl group, or a vinyl group.

* * * * *